(12) United States Patent
Shoji

(10) Patent No.: US 6,756,603 B2
(45) Date of Patent: Jun. 29, 2004

(54) IMAGING APPARATUS

(75) Inventor: Takashi Shoji, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 101 days.

(21) Appl. No.: 09/834,942

(22) Filed: Apr. 16, 2001

(65) Prior Publication Data

US 2001/0045536 A1 Nov. 29, 2001

(30) Foreign Application Priority Data

Apr. 14, 2000 (JP) ........................................ 2000/113946

(51) Int. Cl.⁷ ............................................... G03G 17/00
(52) U.S. Cl. ..................................... 250/591; 250/580
(58) Field of Search .................................. 250/591, 580

(56) References Cited

U.S. PATENT DOCUMENTS

| | | | |
|---|---|---|---|
| 3,556,787 A | * 1/1971 | Letter ........................... | 430/66 |
| 5,268,569 A | 12/1993 | Nelson et al. ........ | 250/214 LA |
| 5,300,784 A | * 4/1994 | Fender et al. ............ | 250/484.2 |
| 5,925,890 A | 7/1999 | Van den Bogaert et al. | 250/580 |
| 6,268,614 B1 | * 7/2001 | Imai ............................ | 250/591 |
| 6,376,857 B1 | * 4/2002 | Imai ............................ | 250/591 |

FOREIGN PATENT DOCUMENTS

| | | | |
|---|---|---|---|
| EP | 0 898 421 A2 | 2/1999 | ............ H04N/5/30 |
| EP | 0 989 730 A2 | 3/2000 | ............ H04N/1/00 |
| EP | 1 041 400 A2 | 10/2000 | ............ G01T/1/24 |
| JP | 8-306328 A | * 11/1996 | ............ H01J/31/50 |
| JP | 9-5906 | 1/1997 | ........... G03B/42/02 |
| JP | 2000-105297 | 4/2000 | ............ G21K/4/00 |
| JP | 2000-162726 | 6/2000 | ........... G03B/42/02 |
| JP | 2000-284056 | 10/2000 | ............ G01T/1/24 |
| WO | 98/59261 | 12/1998 | ............. G01T/1/24 |

* cited by examiner

Primary Examiner—Constantine Hannaher
(74) Attorney, Agent, or Firm—Sughrue Mion, PLLC

(57) ABSTRACT

A planar electrostatic recording material records image information as an electrostatic latent image and generates electric currents in accordance with the latent image when a read-out surface of the electrostatic recording material is scanned with a reading electromagnetic wave. A flat plate-shaped substrate, which has permeability with respect to the reading electromagnetic wave, supports the electrostatic recording material from a side of the read-out surface. A flat plate-shaped base plate supports the substrate from a side opposite to a surface of the substrate, on which surface the electrostatic recording material is formed. The base plate has a rigidity higher than the rigidity of the substrate and has permeability with respect to the reading electromagnetic wave.

14 Claims, 6 Drawing Sheets

F I G. 2
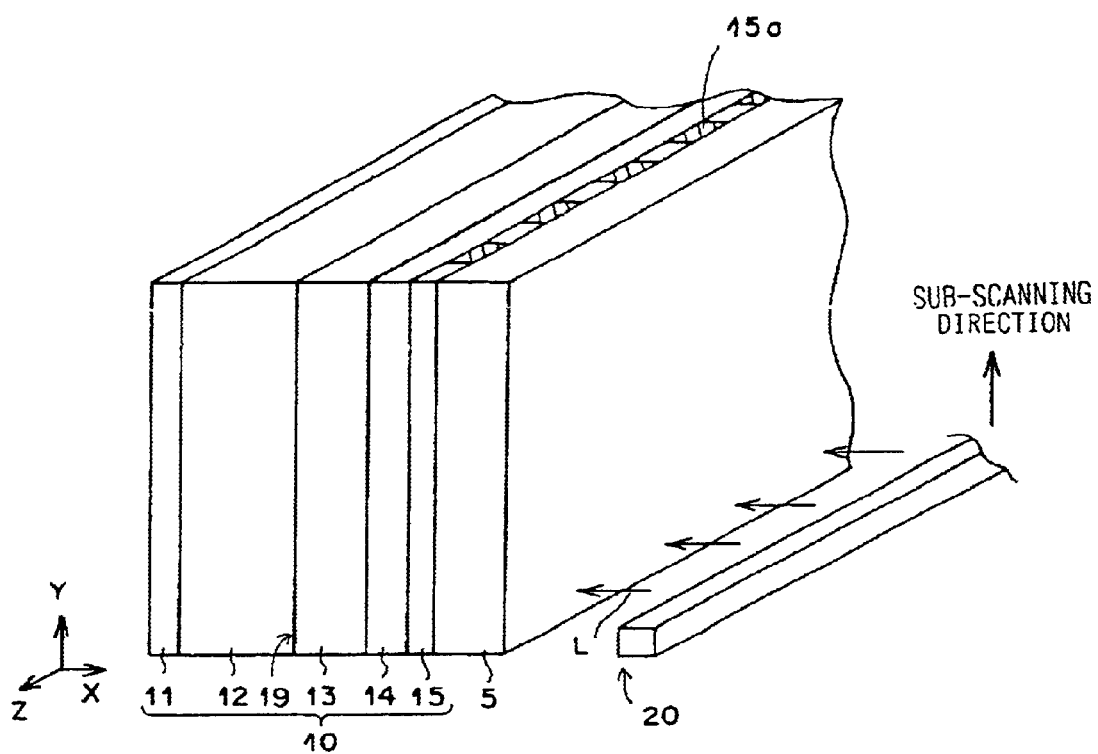

IMAGING APPARATUS

BACKGROUND OF THE INVENTION

1. Field of the Invention

This invention relates to an imaging apparatus. This invention particularly relates to an imaging apparatus, which is provided with an electrostatic recording material, which records image information as an electrostatic latent image, and which generates electric currents in accordance with the recorded electrostatic latent image when a read-out surface of the electrostatic recording material is scanned with a reading electromagnetic wave.

2. Description of the Related Art

Methods and apparatuses for recording and reading out radiation image information by utilizing image detectors have heretofore been proposed. With the proposed methods and apparatuses for recording and reading out radiation image information, such that a radiation dose delivered to an object during a medical radiation image recording operation may be kept small, and such that the image quality of an image and its capability of serving as an effective tool in, particularly, the efficient and accurate diagnosis of an illness may be enhanced, an electrostatic recording material, which is provided with a photo-conductive material sensitive to radiation (such as X-rays), e.g. a selenium plate constituted of a—Se, or the like, is employed as an image detector. The image detector is exposed to radiation, such as X-rays, carrying radiation image information, and electric charges occurring in an amount proportional to the dose of the radiation delivered to the image detector are accumulated as latent image charges in a charge accumulating section formed within the image detector. In this manner, the radiation image information is recorded as an electrostatic latent image at the charge accumulating section. Thereafter, the image detector, on which the radiation image information has been recorded, is scanned with a laser beam or line light acting as reading light, and the radiation image information is thereby read out from the image detector. The methods and apparatuses for recording and reading out radiation image information by utilizing image detectors are described in, for example, U.S. Pat. No. 5,268,569, PCT International Publication No. WO 98/59261, Japanese Unexamined Patent Publication No. 9(1997)-5906, and Japanese Patent Application Nos. 10(1998)-232824, 11(1999)-242876, and 11(1999)-87922.

The electrostatic recording material described above comprises a plurality of layers, such as electrode layers and photo-conductive material layers. Ordinarily, the plurality of the layers are overlaid successively on a glass substrate. As the glass substrate, a thin glass plate having a thickness of at most 1.1 mm, which is ordinarily employed in a liquid crystal display device, is appropriate. The thin glass plate employed in the liquid crystal display device has good chemical resistance, good heat resistance, and the like, which are necessary for the formation of the electrostatic recording material. Also, the thin glass plate employed in the liquid crystal display device is capable of being produced at a low cost.

In cases where the electrostatic recording material is utilized as the image detector of the radiation image recording and read-out apparatus, which is constituted as, for example, a chest image recording and read-out apparatus, it is necessary for a flat plate-shaped image detector having a size of approximately 40 cm×40 cm to be located so as to stand facing the chest of an object standing upright.

However, in cases where the electrostatic recording material is located, for example, vertically as described above, since the electrostatic recording material is supported merely by the thin glass substrate, if end regions of the electrostatic recording material are merely held by holding means, the middle region of the electrostatic recording material will bend. As a result, the problems will occur in that the distance between a reading light source and the electrostatic recording material varies for different sites on the electrostatic recording material, and sharpness of an image, which is obtained from an operation for reading out the electrostatic latent image from the electrostatic recording material, becomes partially low. The decrease in the image sharpness presents a very real problem in the chest image recording and read-out apparatus, and the like, which should yield an accurate image appropriate for the use as a medical image. Also, the problems occur in that thin glass substrate has a low strength and breaks when certain impacts are given to the chest image recording and read-out apparatus, and the like.

SUMMARY OF THE INVENTION

The primary object of the present invention is to provide an imaging apparatus, wherein sharpness of an image, which is obtained from an operation for reading out an electrostatic latent image from an electrostatic recording material, is kept high, and wherein the apparatus has an enhanced strength.

The present invention provides an imaging apparatus, comprising:

i) a planar electrostatic recording material, which records image information as an electrostatic latent image, and which generates electric currents in accordance with the electrostatic latent image when a read-out surface of the planar electrostatic recording material is scanned with a reading electromagnetic wave, ii) a flat plate-shaped substrate, which supports the electrostatic recording material from a side of the read-out surface, and which has permeability with respect to the reading electromagnetic wave, and iii) a flat plate-shaped base plate for supporting the flat plate-shaped substrate from a side opposite to a surface of the substrate, on which surface the electrostatic recording material is formed, the flat plate-shaped base plate having a rigidity higher than the rigidity of the substrate and having permeability with respect to the reading electromagnetic wave.

As the electrostatic recording material, an electrostatic recording material maybe employed, which is capable of recording image information as an electrostatic latent image when being exposed to light (not limited to visible light) carrying the image information. Alternatively, an electrostatic recording material may be employed, which is capable of recording radiation image information as an electrostatic latent image when being exposed to radiation carrying the radiation image information of an object.

In the imaging apparatus in accordance with the present invention, the flat plate-shaped base plate has a rigidity higher than the rigidity of the substrate. Specifically, the base plate may be formed from a material having a rigidity higher than the rigidity of a material constituting the substrate. Alternatively, the base plate and the substrate may be formed from the same material, and the thickness of the base plate may be larger than the thickness of the substrate, such that the base plate may have a rigidity higher than the rigidity of the substrate.

The reading electromagnetic wave may be one of various kinds of electromagnetic waves, with which the electric charges in the electrostatic recording material are capable of being caused to move, and with which the electrostatic latent image is capable of being read out electrically from the electrostatic recording material. Specifically, the reading electromagnetic wave may be light, radiation, or the like. The reading electromagnetic wave passes through the base plate and the substrate and then impinges upon the read-out surface of the electrostatic recording material.

The base plate should preferably have a coefficient of thermal expansion approximately identical with the coefficient of thermal expansion of the substrate.

Also, the base plate should preferably have a refractive index approximately identical with the refractive index of the substrate.

Further, a surface of the base plate and a surface of the substrate, which surfaces stand facing each other, should preferably be adhered by an adhesive agent to each other.

In such cases, the adhesive agent may be selected in accordance with the materials constituting the base plate and the substrate. Specifically, in cases where the base plate and the substrate are constituted of glass, an epoxy resin, Canada balsam, or the like, may be employed as the adhesive agent.

Furthermore, an anti-reflection coating layer for preventing reflection of the reading electromagnetic wave should preferably be formed on a light entry face of the base plate, upon which light entry face the reading electromagnetic wave is incident.

With the imaging apparatus in accordance with the present invention, the substrate for supporting the electrostatic recording material is supported by the base plate, which has the rigidity higher than the rigidity of the substrate. Therefore, in cases where the electrostatic recording material is located in one of various orientations, for example, in a vertical orientation, the middle region of the electrostatic recording material does not bend. Accordingly, an image having high sharpness is capable of being obtained from the operation for reading out the electrostatic latent image. The imaging apparatus in accordance with the present invention is advantageous particularly for obtaining a medical image, which should have a high image sharpness.

Also, with the imaging apparatus in accordance with the present invention, which is provided with the base plate, the resistance to impacts given to the apparatus, and the like, is capable of being kept higher than in an imaging apparatus, in which no base plate is provided and only the substrate is provided.

With the imaging apparatus in accordance with the present invention, wherein the base plate has a coefficient of thermal expansion approximately identical with the coefficient of thermal expansion of the substrate, the base plate and the substrate are capable of being prevented from separating from each other when the temperature changes due to a change in environmental conditions of the apparatus, and the like.

With the imaging apparatus in accordance with the present invention, wherein the base plate has a refractive index approximately identical with the refractive index of the substrate, light loss and stray light are capable of being prevented from occurring due to reflection of the reading electromagnetic wave (reading light) from an interface between the base plate and the substrate. In cases where the reflection of the reading light from the interface between the base plate and the substrate is thus prevented, the sharpness of the read-out image is capable of being enhanced.

With the imaging apparatus in accordance with the present invention, wherein the surface of the base plate and the surface of the substrate, which surfaces stand facing each other, are adhered by the adhesive agent to each other, the base plate and the substrate are capable of being prevented from separating easily from each other.

With the imaging apparatus in accordance with the present invention, wherein the anti-reflection coating layer for preventing reflection of the reading electromagnetic wave is formed on the light entry face of the base plate, upon which light entry face the reading electromagnetic wave is incident, light loss and stray light are capable of being prevented from occurring due to reflection of the reading electromagnetic wave from the light entry face of the base plate. Therefore, the sharpness of the read-out image is capable of being enhanced.

BRIEF DESCRIPTION OF THE DRAWINGS

FIG. 2 is a perspective view showing an example of an image detector and a reading exposure light source section, which are utilized in the chest image recording and read-out apparatus of FIG. 1.

DESCRIPTION OF THE PREFERRED EMBODIMENTS

The present invention will hereinbelow be described in further detail with reference to the accompanying drawings.

Figure 1:
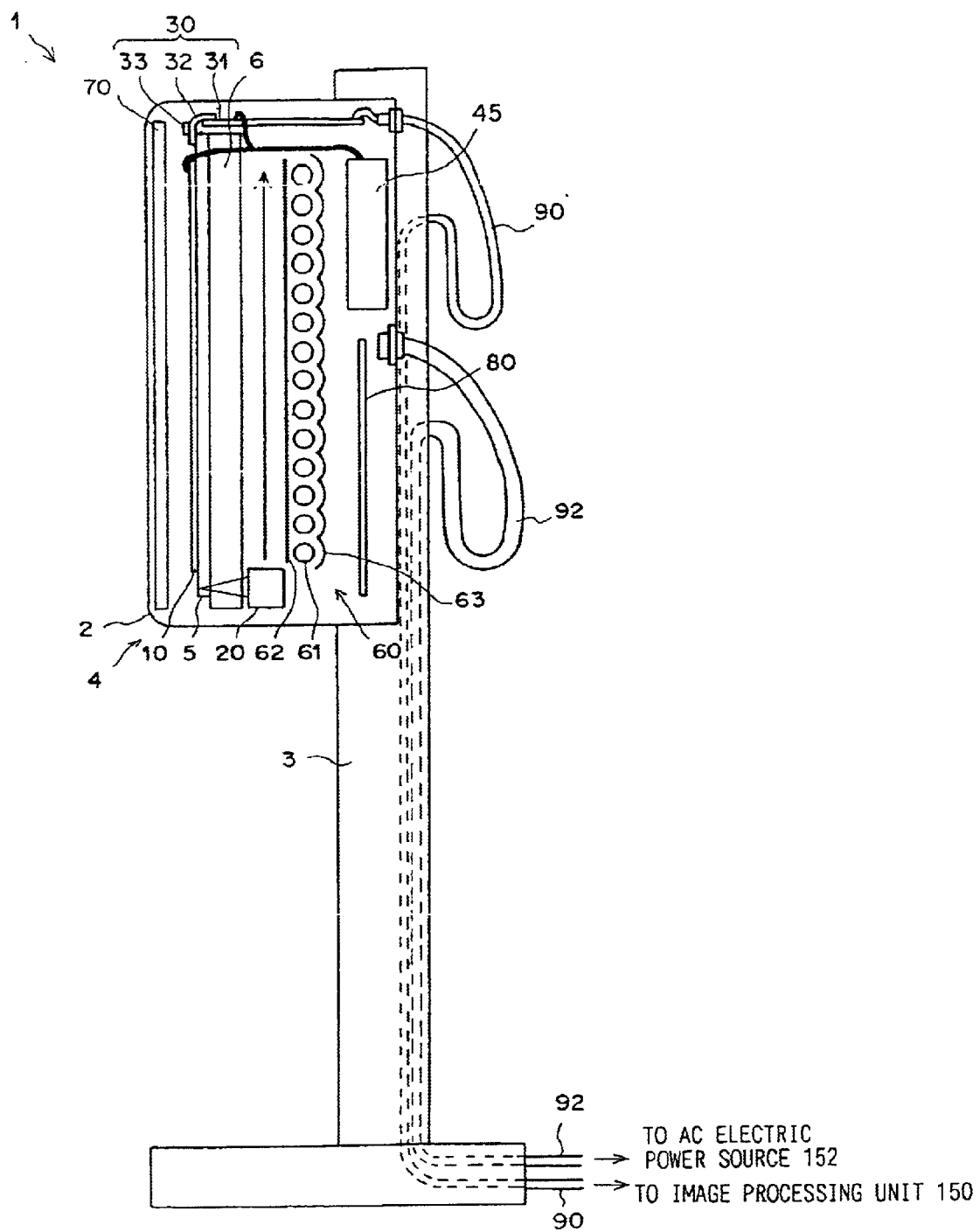
FIG. 1 is a sectional side view showing an embodiment of the imaging apparatus in accordance with the present invention, which is constituted as a chest image recording and read-out apparatus.

FIG. 1 is a sectional side view showing an embodiment of the imaging apparatus in accordance with the present invention, which is constituted as a chest image recording and read-out apparatus 1. As illustrated in FIG. 1, the chest image recording and read-out apparatus 1 comprises an imaging section 4, which is supported for vertical movement by a support post for image recording 3 via an actuator (not shown), such as a ball screw or a cylinder.

The imaging section 4 comprises an image detector 10, which acts as an electrostatic recording material and is formed on a glass substrate 5, and a base plate 6 for supporting the glass substrate 5, on which the image detector 10 has been formed. The imaging section 4 also comprises a reading exposure light source section 20, which is operated when radiation image information having been recorded on the image detector 10 is to be read out from the image detector 10. The imaging section 4 further comprises current detecting means 30 for obtaining an image signal by detecting electric currents, which flow out from the image detector 10 when the image detector 10 is scanned with light having been radiated out from the reading exposure light source section 20. The imaging section 4 still further comprises a high-voltage electric power source section 45 for applying a predetermined voltage across the image detector 10. The imaging section 4 also comprises a pre-exposure light source section 60 for irradiating pre-exposure light to the image detector 10 before an image recording operation is begun. The imaging section 4 further comprises a grid 70 for absorbing scattered rays, which have been scattered by an object (not shown) when radiation passes through the object. The grid 70 is located on one side of the image detector 10, which one side stands facing the object. The imaging section 4 still further comprises a controlling printed-circuit board 80, which constitutes control means for controlling the reading exposure light source section 20, the pre-exposure light source section 60, and the grid 70. The above-enumerated elements constituting the imaging section 4 are accommodated within a case housing 2.

Also, the imaging section 4 is provided with a signal cable 90 for transmitting the image signal, which has been obtained from the current detecting means 30, through the support post for image recording 3 to an exterior image processing unit 150. The imaging section 4 is further provided with a power cable 92, which extends through the support post for image recording 3 and is connected to an exterior alternating current (a.c.) electric power source 152.

As described above, the elements for performing the image recording operation and an image read-out operation are accommodated within the single case housing 2. Therefore, the size of the imaging section 4 is capable of being kept small, and the imaging section 4 is capable of being moved easily. The features of the imaging section 4 are advantageous in practice.

The current detecting means 30 comprises a printed-circuit board 31 and a tape automated bonding (TAB) film 32, which is comparatively short and has one end connected to the printed-circuit board 31. The current detecting means 30 also comprises a charge amplifying IC 33, which is located on the TAB film 32. The other end of the TAB film 32 is connected to the image detector 10.

FIG. 2 is a perspective view showing an example of the image detector 10 and the reading exposure light source section 20. In FIG. 2, the base plate 6 is not shown.

The image detector 10 records the radiation image information as an electrostatic latent image and generates electric currents in accordance with the electrostatic latent image when it is scanned with a reading electromagnetic wave (hereinbelow referred to as reading light). Specifically, as illustrated in FIG. 2, the image detector 10 is formed on the glass substrate 5. The image detector 10 comprises a first electrically conductive layer 11, which has permeability to recording electromagnetic wave, and the like, e.g. X-rays carrying image information of an object. The recording electromagnetic wave will hereinbelow be referred to as the recording light. The image detector 10 also comprises a recording photo-conductive layer 12, which generates electric charges and exhibits photo-conductivity when it is exposed to the recording light. The image detector 10 further comprises a charge transporting layer 13, which acts approximately as an insulator with respect to latent image polarity charges (e.g., negative charges) occurring in the first electrically conductive layer 11, and which acts approximately as a conductor with respect to transported polarity charges (positive charges in this example) having a polarity opposite to the polarity of the latent image polarity charges occurring in the first electrically conductive layer 11. The image detector 10 still further comprises a reading photo-conductive layer 14, which generates electric charges and exhibits photo-conductivity when it is exposed to reading light, and a second electrically conductive layer 15 having permeability to the reading light. The first electrically conductive layer 11, the recording photo-conductive layer 12, the charge transporting layer 13, the reading photo-conductive layer 14, and the second electrically conductive layer 15 are overlaid in this order. A charge accumulating section 19 is formed at an interface between the recording photo-conductive layer 12 and the charge transporting layer 13.

Each of the first electrically conductive layer 11 and the second electrically conductive layer 15 constitutes an electrode. The electrode of the first electrically conductive layer 11 is formed as a flat plate-shaped electrode, which is flat in two-dimensional directions. As indicated by the hatching in FIG. 2, the electrode of the second electrically conductive layer 15 is formed as a striped electrode comprising a plurality of elements (linear electrodes) 15a, 15a, . . . , which are arrayed in a striped pattern at a pixel pitch. (As for the striped electrode, reference may be made to an electrostatic recording material described in Japanese Patent Application No. 10(1998)-232824. The array direction of the elements 15a, 15a, . . . , along which the elements 15a, 15a, . . . stand side by side, corresponds to the main scanning direction. The longitudinal direction of each element 15a corresponds to the sub-scanning direction.

The reading photo-conductive layer 14 should preferably be constituted of a photo-conductive material having a high sensitivity with respect to an electromagnetic wave having wavelengths (300 nm to 550 nm) of the near ultraviolet to blue region and having a low sensitivity with respect to an electromagnetic wave having wavelengths (at least 700 nm) of the red region. Specifically, the reading photo-conductive layer 14 should preferably contain, as a principal constituent, at least one constituent selected from the group consisting of a—Se, $PbI_2$, $Bi_{12}(Ge, Si)O_{20}$, perylene bis-imide (R=n-propyl), and perylene bis-imide (R=n-neopentyl). In this embodiment, the reading photo-conductive layer 14 is constituted of a—Se.

In this embodiment, the width of each element 15a is 50 $\mu$m. Also, the elements 15a, 15a, . . . are arrayed at a pixel pitch of 100 $\mu$m. The elements 15a, 15a, . . . are constituted of a material permeable to light having wavelengths of at most 550 nm, e.g., indium tin oxide (ITO) or thin film Al.

As the glass substrate 5, a glass substrate having permeability with respect to the reading light and having a thickness of at most 1.1 mm, which glass substrate is utilized ordinarily in a liquid crystal display device, is employed.

Figure 3:
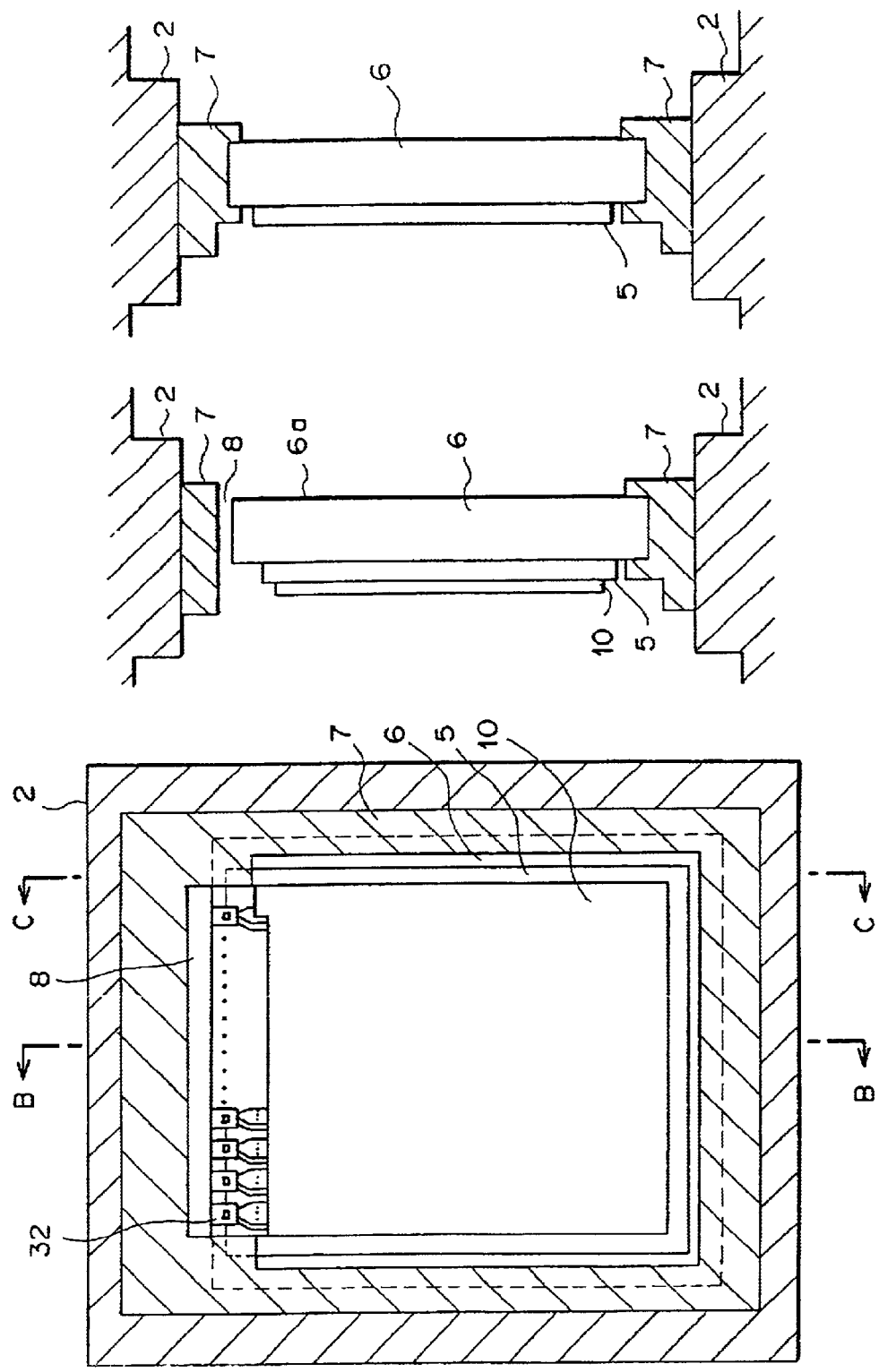
FIG. 3A is a front view showing a base plate, which supports the image detector, and a case housing, which front view is taken from the side of the image detector.
FIG. 3B is a sectional view taken on line B—B of FIG. 3A.
FIG. 3C is a sectional view taken on line C—C of FIG. 3A.

FIG. 3A is a front view showing the image detector 10 at the imaging section 4, the glass substrate 5 for supporting the image detector 10, the base plate 6, and the case housing 2, which front view is taken from the side of the image detector 10. FIG. 3B is a sectional view taken on line B—B of FIG. 3A. FIG. 3C is a sectional view taken on line C—C of FIG. 3A. As illustrated in FIGS. 3A, 3B, and 3C, the base plate 6 supports the glass substrate 5, on which the image detector 10 has been formed. Ordinarily, the glass substrate 5 has a thickness of at most 1.1 mm and is thus markedly thin. The base plate 6 is constituted of a sufficiently thick glass plate, such that the base plate 6 does not bend when the base plate 6 is located vertically as illustrated in FIGS. 3A, 3B, and 3C. In this embodiment, the base plate 6 has a thickness of at least 5 mm. The base plate 6 has permeability with respect to the light radiated out from a reading exposure light source and light radiated out from a pre-exposure light source. Also, the base plate 6 has a refractive index and a coefficient of thermal expansion, which are approximately identical with the refractive index and the coefficient of thermal expansion of the glass substrate 5. Further, in order for light loss and stray light due to reflection of the reading light to be prevented from occurring, an anti-reflection (AR) coating film is formed on a reading light entry face 6a of the base plate 6. The base plate 6 and the glass substrate 5 are adhered to each other with an adhesive agent, such a an epoxy resin or Canada balsam. As illustrated in FIGS. 3A, 3B, and 3C, four corner regions, right and left side regions, and a bottom region of the base plate 6 are fitted into a fitting member 7 constituted of a metal, or the like, and the base plate 6 is thus reinforced and secured to the case housing 2. A space 8, through which the TAB film 32 for connecting the image detector 10 and the printed-circuit board 31 to each other passes, is formed between the top region of the base plate 6 and the fitting member 7. Specifically, as illustrated in FIG. 3B, the space 8 is formed between the top region of the base plate 6, which top region extends above the image detector 10, and the fitting member 7. Also as illustrated in FIG. 3C, the upper right corner region of the base plate 6 shown in FIG. 3A is fitted into the fitting member 7.

In this embodiment, the substrate 5 and the base plate 6 are formed from glass. However, the materials constituting the substrate 5 and the base plate 6 are not limited to glass. For example, the substrate 5 and the base plate 6 may be formed from an organic polymer material, or the like, which has permeability with respect to the reading light.

Also, in order for the image quality to be prevented from becoming bad due to backward scattered rays, the base plate 6 may contain a substance, such as PbO, which is capable of absorbing the radiation.

The reading exposure light source section 20 comprises a light source, which is constituted of a plurality of LED chips arrayed in a line, and an optical system for linearly irradiating the light, which has been radiated out from the light source, to the image detector 10. The reading exposure light source section 20 is kept at a predetermined distance from the image detector 10 and is moved by a linear motor (not shown) in the longitudinal direction of each element 15a of the second electrically conductive layer 15 of the image detector 10. In this manner, the entire area of the image detector 10 is exposed to the light having been radiated out from the light source.

As described above, the reading photo-conductive layer 14 is constituted of the photo-conductive material having a high sensitivity with respect to the electromagnetic wave having wavelengths (300 nm to 550 nm) of the near ultraviolet to blue region and having a low sensitivity with respect to the electromagnetic wave having wavelengths (at least 700 nm) of the red region. Therefore, as the light source of the reading exposure light source section 20, a light source, which produces light having wavelengths (at most 550 nm) of the near ultraviolet to blue region, is employed.

Figure 4:
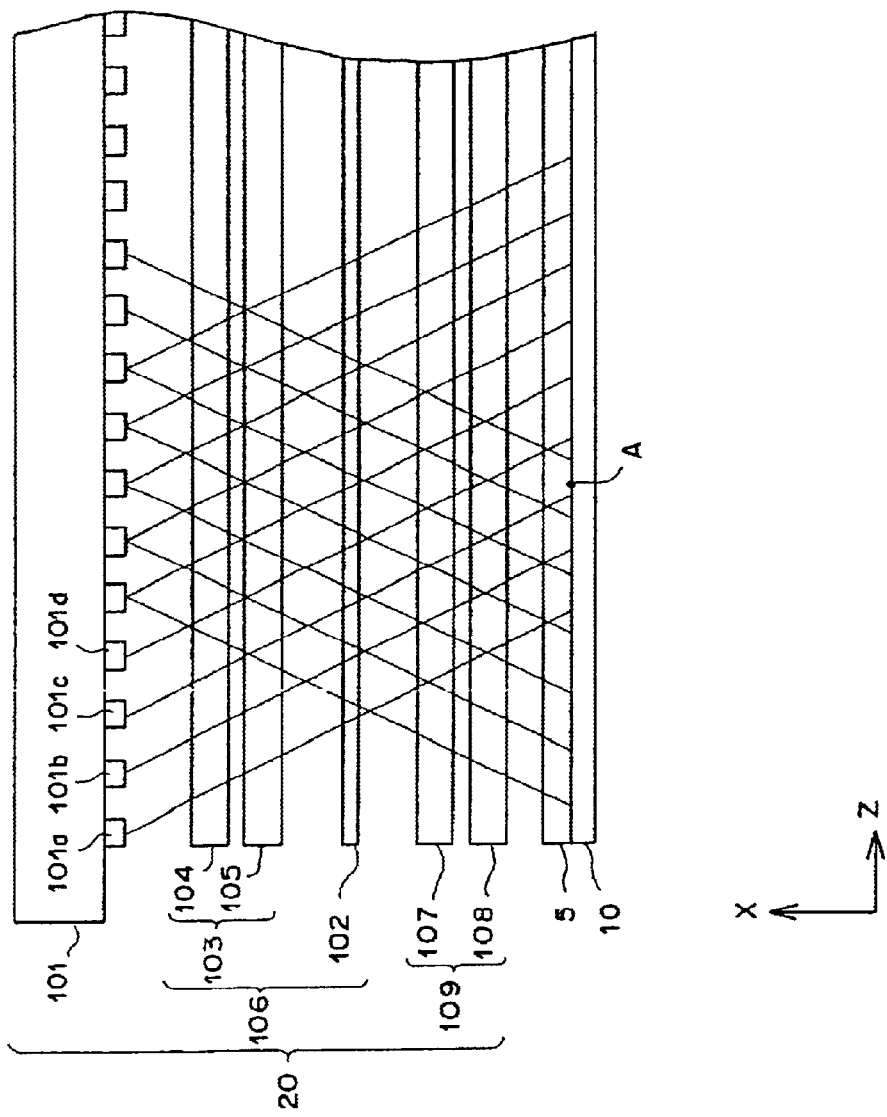
FIG. 4A is a side view showing an example of the reading exposure light source section of FIG. 2, which side view is taken from a Y direction.
FIG. 4B is an X–Y sectional view showing the example of the reading exposure light source section of FIG. 4A.

An example of the reading exposure light source section 20 will be described hereinbelow with reference to FIGS. 4A and 4B. FIG. 4A is a side view showing the example of the reading exposure light source section 20 of FIG. 2, which side view is taken from a Y direction. FIG. 4B is an X–Y sectional view showing the example of the reading exposure light source section 20 of FIG. 4A. In FIGS. 4A and 4B, the base plate 6 is not shown.

As illustrated in FIGS. 4A and 4B, the reading exposure light source section 20 comprises a light source 101, which comprises a plurality of LED chips 101a, 101b, . . . arrayed linearly in a Z axis direction. The reading exposure light source section 20 also comprises first optical means 106 for enhancing the quality of the light having been radiated out from the light source 101. The first optical means 106 is provided with a slit member 102, which has an opening area 102a extending in the longitudinal direction of the light source 101, and cylindrical lenses 104 and 105, which constitute an optical member 103 for converging the light toward the opening area 102a of the slit member 102. The reading exposure light source section 20 further comprises second optical means 109. The second optical means 109 is provided with cylindrical lenses 107 and 108 for converging the light, which has passed through the first optical means 106, onto the surface of the image detector 10 and with respect to the direction normal to the longitudinal direction of the light source 101.

The slit member 102 performs spatial filtering of the light, which has been radiated out from the light source 101, in order to restrict flare light and determines the beam width on the image detector 10. It is sufficient for the slit member to restrict the spatial spread of the light. The slit member is not limited to the mechanical slit member 102 having the opening area 102a and may be a slit member having an optical space, such as a distributed density filter.

Each of light beams, which have been radiated out from the light emission points, i.e. the LED chips 101a, 101b, . . . of the light source 101, is converged by the cylindrical lenses 104 and 105 toward the opening area 102a of the slit member 102 and into a light beam extending along the longitudinal direction of the opening area 102a and is thus subjected to filtering. Each of the light beams is then converged by the cylindrical lenses 107 and 108 of the second optical means 109 and with respect to the direction normal to the longitudinal direction of the light source 101. Each of the thus converged light beams is irradiated onto the image detector 10. Each of the light beams, which have been radiated out from the LED chips 101a, 101b, . . . , spreads and diffuses uniformly in all directions and is not converged with respect to the longitudinal direction of the light source 101. Therefore, on the image detector 10, each of the light beams, which have been radiated out from the LED chips 101a, 101b, . . . , spreads in the longitudinal direction of the light source 101. As a result, the light having been radiated out from the light source 101 is linearly irradiated to the image detector 10, and a plurality of pixels arrayed linearly on the image detector 10 are simultaneously exposed to each of the light beams having been radiated out from the LED chips 101a, 101b, . . . Specifically, the light beams, which have been radiated out from several LED chips among the LED chips 101a, 101b, . . . , are simultaneously irradiated to an identical pixel on the image detector 10. For example, as illustrated in FIG. 4A, the light beams, which have been radiated out from seven LED chips among the LED chips 101a, 101b, . . . , are simultaneously irradiated to an identical point A on the image detector 10.

More specifically, for example, the focal length of the optical system may be 40 mm, and the pixel size may be 100 $\mu$m. Also, the intervals between the LED chips (i.e., the intervals between the light emission points) maybe 200 $\mu$m, and the beam spread angle, which is taken from each LED chip and in the longitudinal direction of the light source, may be 120° (half value). In such cases, the light beams, which have been radiated out from at least 700 LED chips, are simultaneously irradiated to an identical pixel on the image detector 10.

At the reading exposure light source section 20 described above, in lieu of the cylindrical lenses 104 and 105 of the first optical means 106, a SELFOC lens may be employed.

Also, the light source 101 of the reading exposure light source section 20 described above comprises the plurality of the arrayed LED chips 101a, 101b, . . . Alternatively, in lieu of the LED chips 101a, 101b, . . . , a plurality of LD chips may be arrayed. As another alternative, an LED array or an LD array comprising a plurality of light emission points arrayed linearly may be employed as the light source.

Figure 5:
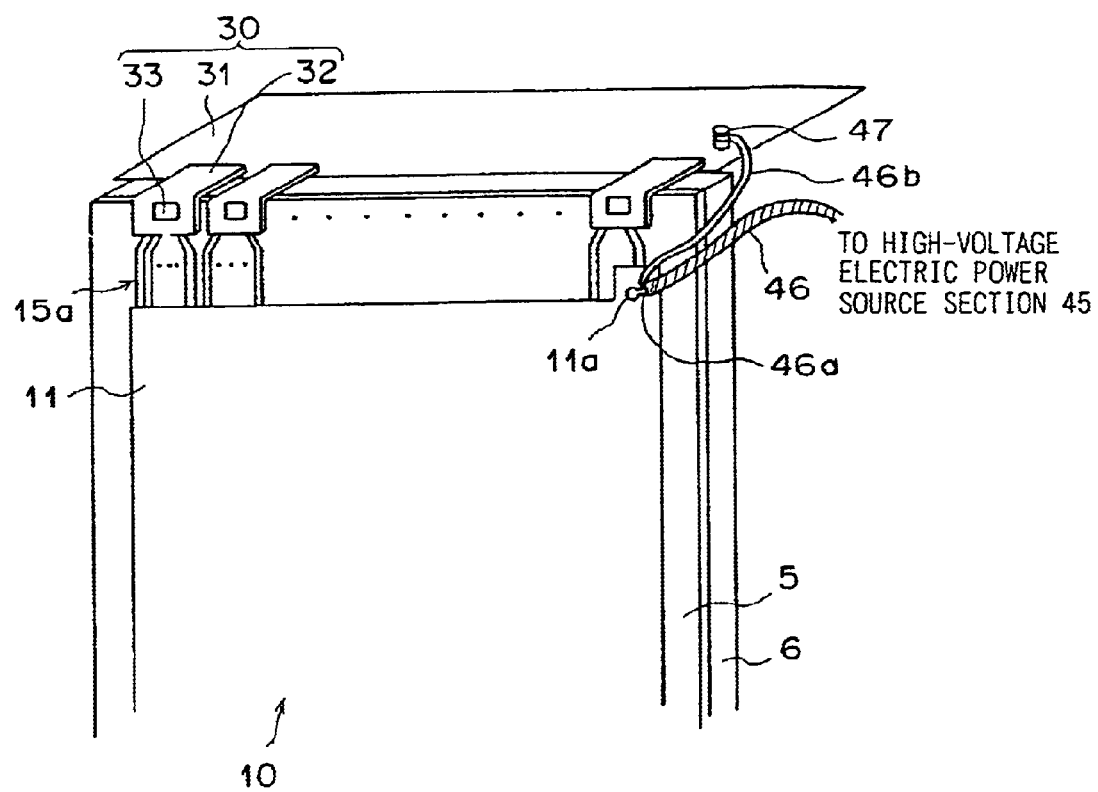
FIG. 5 is a perspective view showing how the image detector, current detecting means, and a high-voltage electric power source section are connected to one another.

FIG. 5 is a perspective view showing how the image detector 10, the current detecting means 30, and the high-voltage electric power source section 45 are connected to one another. As illustrated in FIG. 5, each of the elements 15a, 15a, . . . of the image detector 10 is connected to the charge amplifying IC 33 via a printed-circuit pattern (not shown), which is formed on the TAB film 32. Also, the charge amplifying IC 33 is connected to the printed-circuit board 31 via a printed-circuit pattern (not shown), which is formed on the TAB film 32. In this embodiment, instead of all elements 15a, 15a, . . . being connected to a single charge amplifying IC 33, several charge amplifying IC's 33, 33, . . . to several tens of charge amplifying IC's 33, 33, . . . are utilized as a whole, and several adjacent elements 15a, 15a, . . . are connected to one of the charge amplifying IC's 33, 33, . . .

The first electrically conductive layer 11, which is constituted as the flat plate-shaped electrode of the image detector 10, is provided with a non-imaging region 11a, which extends from the image recording region. A hot side (a core wire) 46a of a cable 46, which extends from the high-voltage electric power source section 45 located in the vicinity of the image detector 10, is directly bonded to the non-imaging region 11a. A grounding side (a cladding layer) 46b of the cable 46 is connected by a screw 47 to the printed-circuit board 31. In this embodiment, the hot side 46a is set at a minus potential with respect to the grounding side 46b. The grounding side 46b connected to the printed-circuit board 31 is connected to each charge amplifying IC 33 via the TAB film 32 and thus acts as a reference potential of the charge amplifying IC 33.

As described above, in the chest image recording and read-out apparatus 1, the high-voltage electric power source section 45 is located in the vicinity of the image detector 10 and the printed-circuit board 31. Therefore, the length of the cable 46 for the connection of the electric power source is capable of being kept short. Also, a special cable need not be utilized as the cable 46. Accordingly, processing of the cable 46 becomes easy. Further, the hot side 46a of the cable 46 is connected directly by the bonding to the image detector 10, and the grounding side 46b of the cable 46 is connected directly by the screw 47 to printed-circuit board 31. As a result, a special connector need not be utilized, and the cost of the chest image recording and read-out apparatus 1 is capable of being kept low.

In this embodiment, the TAB connection is utilized for the connection of the image detector 10 and the printed-circuit board 31 to each other. Alternatively, the image detector 10 and the printed-circuit board 31 may be connected to each other by utilizing wire bonding or anisotropic electrically conductive rubber.

Figure 6:
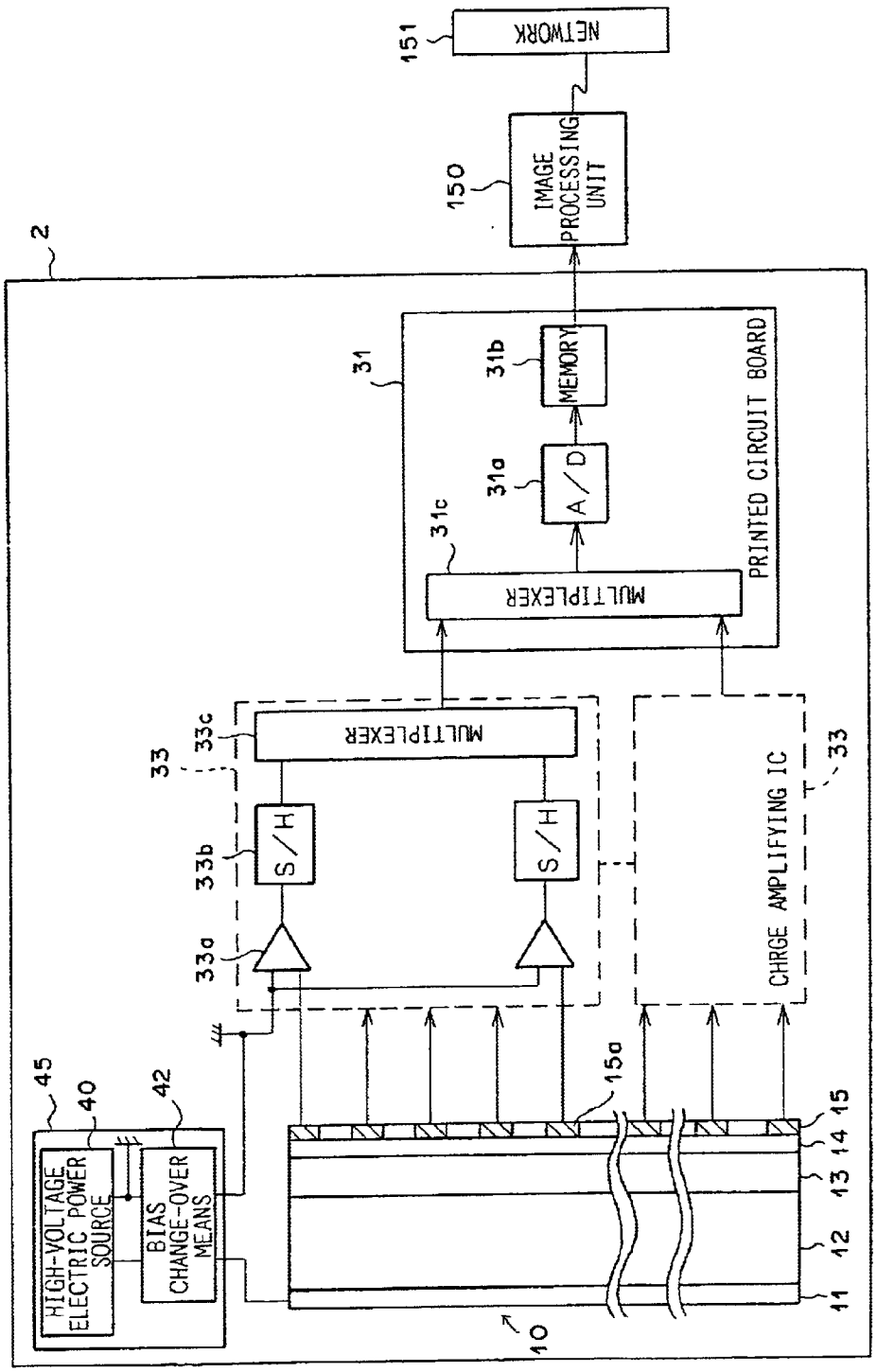
FIG. 6 is a block diagram showing how the current detecting means and the high-voltage electric power source section are connected to the image detector.

FIG. 6 is a block diagram showing how the current detecting means 30 and the high-voltage electric power source section 45, which are located within the case housing 2, are connected to the image detector 10.

As illustrated in FIG. 6, the high-voltage electric power source section 45 is constituted of a circuit, which comprises a high-voltage electric power source 40 and bias change-over means 42. The high-voltage electric power source 40 is connected to the image detector 10 via the bias change-over means 42 for changing over between bias application to the image detector 10 and short-circuiting. The circuit constituting the high-voltage electric power source section 45 is designed for prevention of charging and discharging excessive electric current, such that a peak value of the electric current flowing at the time of change-over may be limited and a portion of the apparatus, at which the electric current concentrates, may be prevented from being broken.

The charge amplifying IC 33 formed on the TAB film 32 comprises a plurality of charge amplifiers 33a, 33a, . . . , each of which is connected to one element 15a of the image detector 10. The charge amplifying IC 33 also comprises a plurality of sampling and holding circuits (S/H) 33b, 33b, . . . , each of which is connected to one charge amplifier 33a. The charge amplifying IC 33 further comprises a multiplexer 33c for multiplexing signals obtained from the sampling and holding circuits 33b, 33b, . . . Each of the electric currents flowing out from the image detector 10 is converted by each charge amplifier 33a into a voltage. The voltage is sampled and held by the corresponding sampling and holding circuit 33b at predetermined timings. The voltages, which have been sampled and held and which correspond to the respective elements 15a, 15a, . . . , are successively fed out from the multiplexer 33c, such that the voltages are changed over in the array order of the elements 15a, 15a, . . . (The successive feeding-out of the voltages from the multiplexer 33c corresponds to part of the main scanning operation.) The signals, which have been successively fed out from the multiplexer 33c, are fed into a multiplexer 31c, which has been formed on the printed-circuit board 31. Also, the voltages, which correspond to the respective elements 15a, 15a, . . . , are successively fed out from the multiplexer 31c, such that the voltages are changed over in the array order of the elements 15a, 15a, . . . The main scanning operation is finished with this step. The signals, which have been successively fed out from the multiplexer 31c, are converted by an analog-to-digital converter (A/D) 31a into a digital signal. The thus obtained digital signal is stored in a memory 31b.

As the pre-exposure light source of the pre-exposure light source section 60, it is necessary to utilize a light source having characteristics such that the pre-exposure light is emitted and quenched quickly and exhibits little afterglow. In this embodiment, an external electrode type of rare gas fluorescent lamp is utilized as the pre-exposure light source. Specifically, as illustrated in FIG. 1, the pre-exposure light source section 60 comprises a plurality of external electrode types of rare gas fluorescent lamps 61, 61, . . . , which extend in a direction normal to the plane of the sheet of FIG. 1. The pre-exposure light source section 60 also comprises a wavelength selecting filter 62, which is located between the rare gas fluorescent lamps 61, 61, . . . and the image detector 10. The pre-exposure light source section 60 further comprises a reflecting plate 63 located on the side of the rare gas fluorescent lamps 61, 61, . . . , which side is opposite to the wavelength selecting filter 62. The reflecting plate 63 efficiently reflects the light, which has been radiated out from the rare gas fluorescent lamps 61, 61, . . . , toward the image detector 10. It is sufficient for the pre-exposure light to be irradiated to the entire second electrically conductive layer 15 of the image detector 10, and particular light converging means need not be provided. However, the pre-exposure light should preferably have a narrow illuminance distribution. As the pre-exposure light source, in lieu of the rare gas fluorescent lamps 61, 61, ..., for example, a surface-shaped light source comprising a plurality of LED chips arrayed in a surface form may be utilized. Also, in cases where the base plate 6 is imparted with the wavelength selecting properties, the wavelength selecting filter 62 may be omitted.

When the electrostatic latent image is to be read out from the image detector 10, basically, the latent image charges having been accumulated in the image detector 10 are capable of being read out perfectly. However, it will often occur that the image detector 10 cannot be read out perfectly, and residual charges remain in the image detector 10. Also, when the electrostatic latent image is to be recorded on the image detector 10, a high voltage is applied across the image detector 10 before the recording light is irradiated to the image detector 10. When the high voltage is applied across the image detector 10, dark current occurs, and electric charges (dark current charges) due to the dark current are accumulated in the image detector 10. Further, it has been known that various kinds of electric charges other than the residual charges and the dark current charges are also accumulated in the image detector 10 before the recording light is irradiated to the image detector 10. The unnecessary charges, such as the residual charges and the dark current charges, which are accumulated in the image detector 10 before the recording light is irradiated to the image detector 10, are added to the electric charges, which are accumulated in the image detector 10 when the recording light is irradiated to the image detector 10 and which carry image information. As a result, when the electrostatic latent image is read out from the image detector 10, besides the signal components in accordance with the electric charges carrying the image information, signal components due to the unnecessary charges are contained in the signals, which are obtained from the image detector 10. In such cases, the problems with regard to a residual image phenomenon and decrease of the signal-to-noise ratio occur.

The pre-exposure operation is performed in order to erase the unnecessary charges, which are accumulated in the image detector 10 before the recording light is irradiated to the image detector 10, and to eliminate the problems with regard to a residual image phenomenon and decrease of the signal-to-noise ratio.

How the chest image recording and read-out apparatus 1 operates will be described hereinbelow.

Firstly, the imaging section 4 is moved vertically and located at a height appropriate for the size of the object (a patient).

Thereafter, the pre-exposure light is irradiated to the image detector 10, and the unnecessary charges having been accumulated in the image detector 10 are erased.

The pre-exposure operation may be performed before the voltage is applied across the image detector 10. Alternatively, the pre-exposure operation may be performed after the voltage has been applied across the image detector 10. Also, the pre-exposure light source may be turned on before the voltage is applied across the image detector 10, and may be turned off after the voltage has been applied across the image detector 10.

When the electrostatic latent image is to be recorded on the image detector 10, firstly, a negative pole of the high-voltage electric power source 40 is connected by the bias change-over means 42 to the first electrically conductive layer 11, and the d.c. voltage is applied across the first electrically conductive layer 11 and the elements 15a, 15a, ... In this manner, the first electrically conductive layer 11 and the second electrically conductive layer 15 are electrically charged. As a result, a U-shaped electric field having the concavity of the U-shape at the element 15a is formed between the first electrically conductive layer 11 and the element 15a in the image detector 10.

Thereafter, the operator pushes an irradiation push button (not shown) with an appropriate timing. As a result, the grid 70 located on the side of the imaging section 4, which side stands facing the object, begins swinging. X-rays are irradiated to the image detector 10 at the time at which the swinging speed of the grid 70 reaches a predetermined speed and a sufficient voltage has been applied across the image detector 10 with the voltage application described above.

In the manner described above, the X-rays having passed through the object, i.e. the recording light carrying the radiation image information of the object, is irradiated to the image detector 10. As a result, pairs of positive and negative charges occur in the recording photo-conductive layer 12 of the image detector 10. Of the pairs of positive and negative charges, the negative charges are centralized upon the elements 15a, 15a, ... along the electric field distribution described above. In this manner, the negative charges are accumulated at the charge accumulating section 19, which is formed at the interface between the recording photo-conductive layer 12 and the charge transporting layer 13. The amount of the accumulated negative charges, i.e. the latent image polarity charges, is approximately in proportion to the dose of the radiation carrying the radiation image information. Therefore, the latent image polarity charges carry the electrostatic latent image. In this manner, the electrostatic latent image is recorded on the image detector 10. The positive charges occurring in the recording photo-conductive layer 12 are attracted to the first electrically conductive layer 11, combine with negative charges injected from the high-voltage electric power source 40, and disappear.

After the X-rays are irradiated to the image detector 10 and the electrostatic latent image has been recorded on the image detector 10, the electrostatic latent image is read out from the image detector 10. When the electrostatic latent image is to be read out from the image detector 10, the first electrically conductive layer 11 and the second electrically conductive layer 15 of the image detector 10 are short-circuited by the bias change-over means 42.

Also, the reading exposure light source section 20 is operated, and the reading light is radiated out from the light source 101. Also, the reading exposure light source section 20 is moved by the linear motor (not shown) and in the longitudinal direction of each element 15a, i.e. in the sub-scanning direction. In this manner, the entire area of the image detector 10 is scanned with the reading light. As described above with respect to the reading exposure light source section 20, the line-like reading light, which has been radiated out from the reading exposure light source section 20, passes through the base plate 6 and the glass substrate 5 and is irradiated to each of the elements 15a, 15a, ... of the image detector 10.

As a result, pairs of positive and negative charges occur in the reading photo-conductive layer 14. Of the pairs of positive and negative charges, the positive charges move quickly through the charge transporting layer 13 so as to be attracted by the negative charges (the latent image polarity charges), which have been accumulated at the charge accumulating section 19. The positive charges combine with the latent image polarity charges at the charge accumulating section 19 and disappear. The negative charges occurring in the reading photo-conductive layer 14 combine with positive charges, which are injected into the second electrically conductive layer 15, and disappear. In this manner, the negative charges having been accumulated in the image detector 10 disappear through the charge re-combination, and electric currents due to the movement of the electric charges at the time of the charge re-combination occur in the image detector 10.

The electric currents are detected for the respective elements 15a, 15a, . . . in a parallel manner (simultaneously) by the charge amplifiers 33a, 33a, . . . for current detection, each of which is connected to one of the elements 15a, 15a, . . . Each of the signals, which have been detected by the charge amplifiers 33a, 33a, . . . , is sampled and held by the corresponding sampling and holding circuit 33b. The voltages, which have thus been sampled and held and which correspond to the respective elements 15a, 15a, . . . , are successively fed out from the multiplexer 33c, such that the voltages are changed over in the array order of the elements 15a, 15a, . . . The signals, which have been successively fed out from the multiplexer 33c, are fed into the multiplexer 31c, which has been formed on the printed-circuit board 31. Also, the voltages, which correspond to the respective elements 15a, 15a, . . . , are successively fed out from the multiplexer 31c, such that the voltages are changed over in the array order of the elements 15a, 15a, . . . The signals, which have been successively fed out from the multiplexer 31c, are converted by the analog-to-digital converter 31a into the digital signal. The thus obtained digital signal is stored in the memory 31b.

The electric currents, which flow through the image detector 10 when the image detector 10 is scanned with the reading light, occur in accordance with the latent image charges, i.e. the electrostatic latent image. Therefore, the image signal obtained by detecting the electric currents represents the electrostatic latent image. In this manner, the electrostatic latent image is capable of being read out.

The image signal, which has been stored in the memory 31b, is fed via the signal cable 90 into the external image processing unit 150. In the image processing unit 150, the image signal is subjected to appropriate image processing. The image signal, which has been obtained from the image processing, is up-loaded to a network 151 and fed into a server or a printer together with corresponding information, which gives specifics about the image recording operation.

In the embodiments described above, the electrostatic recording material described in Japanese Patent Application No. 10(1998)-232824 is utilized as the image detector 10. However, in the imaging apparatus in accordance with the present invention, the image detector is not limited to the electrostatic recording material described above. Specifically, the imaging apparatus in accordance with the present invention may be provided with one of various kinds of image detectors, which generate electric currents in accordance with the latent image charges carrying image information when it is scanned with a reading electromagnetic wave.

What is claimed is:

1. An imaging apparatus, comprising:
    i) a planar electrostatic recording material, which records image information as an electrostatic latent image, and which generates electric currents in accordance with the electrostatic latent image when a read-out surface of the planar electrostatic recording material is scanned with a reading electromagnetic wave,
    ii) a flat plate-shaped substrate, which supports the electrostatic recording material from a side of the read-out surface, and which has permeability with respect to the reading electromagnetic wave,
    iii) a flat plate-shaped base plate for supporting the flat plate-shaped substrate from a side opposite to a surface of the substrate, on which surface the electrostatic recording material is formed, the flat plate-shaped base plate having a rigidity higher than the rigidity of the substrate and having permeability with respect to the reading electromagnetic wave and
    iv) a case housing, wherein the flat plate-shaped base plate is fixed to the case housing.

2. An apparatus as defined in claim 1 wherein the base plate has a coefficient of thermal expansion approximately identical with the coefficient of thermal expansion of the substrate.

3. An apparatus as defined in claim 2 wherein the base plate has a refractive index approximately identical with the refractive index of the substrate.

4. An apparatus as defined in claim 1 wherein the base plate has a refractive index approximately identical with the refractive index of the substrate.

5. An apparatus as defined in claim 1, 2, 4, or 3 wherein a surface of the base plate and a surface of the substrate, which surfaces stand facing each other, are adhered by an adhesive agent to each other.

6. An apparatus as defined in claim 1, 2, 4, or 3 wherein an anti-reflection coating layer for preventing reflection of the reading electromagnetic wave is formed on a light entry face of the base plate, upon which light entry face the reading electromagnetic wave is incident.

7. The apparatus defined in claim 1 wherein the base plate is disposed towards the side opposite to the surface of the flat plate-shaped substrate, on which surface the electrostatic recording material is formed.

8. The apparatus defined in claim 1 wherein the base plate includes a top edge, side edges, and a bottom edge, and the case housing supports the base plate at at least the side edges.

9. The apparatus defined in claim 8 wherein the case housing supports the base plate at the side edges and the bottom edge.

10. The apparatus defined in claim 8 further comprising means for transferring the electrical currents out from the planar electrostatic recording material, disposed at the top edge.

11. The apparatus defined in claim 1 wherein the planar electrostatic recording material as including a first electrically conductive layer and a second electrically conductive layer, wherein the second electrically conductive layer is disposed at the read-out surface of the planar electrostatic recording material and the first electrically conductive layer is disposed at a surface opposing the read-out surface of the planar electrostatic recording material.

12. The apparatus defined in claim 11 wherein a recording photo-conductive layer and a reading photo-conductive layer being disposed between the first and second electrically conductive layers.

13. The apparatus defined in claim 1 wherein the flat plate-shaped base plate is held at at least two end regions of a top region of the flat plate-shaped base plate and substantially does not bend.

14. The apparatus defined in claim 13 further comprising a current detecting means disposed between the two end regions of the top region of the flat plate-shaped base plate, the current detecting means communicating with the flat plate-shaped substrate.

* * * * *